(12) United States Patent
Olovsson et al.

(10) Patent No.: US 10,844,755 B2
(45) Date of Patent: Nov. 24, 2020

(54) ROTATIONAL HYDRAULIC LOGIC DEVICE AND VARIABLE CAM TIMING PHASER UTILIZING SUCH A DEVICE

(71) Applicant: Scania CV AB, Södertälje (SE)

(72) Inventors: Daniel Olovsson, Södertälje (SE); Mikael Eriksson, Torslanda (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/306,744

(22) PCT Filed: May 10, 2017

(86) PCT No.: PCT/SE2017/050468
§ 371 (c)(1),
(2) Date: Dec. 3, 2018

(87) PCT Pub. No.: WO2017/213569
PCT Pub. Date: Dec. 14, 2017

(65) Prior Publication Data
US 2019/0128149 A1    May 2, 2019

(30) Foreign Application Priority Data
Jun. 8, 2016 (SE) ...................................... 1650797

(51) Int. Cl.
*F01L 1/344*    (2006.01)
*F01L 1/356*    (2006.01)
(Continued)

(52) U.S. Cl.
CPC ......... *F01L 1/3442* (2013.01); *F01L 1/34409* (2013.01); *F01L 1/356* (2013.01);
(Continued)

(58) Field of Classification Search
CPC ................. F01L 1/3442; F01L 1/34409; F01L 2001/34433; F01L 2001/34426; F01L 2001/3443; F01L 1/34; F01L 2001/34423
(Continued)

(56) References Cited

U.S. PATENT DOCUMENTS 5,056,477 A    10/1991    Linder et al.
5,649,506 A    7/1997    Melchior
(Continued)

FOREIGN PATENT DOCUMENTS

CN    101171404 A    4/2008
CN    102003292 A    4/2011
(Continued)

OTHER PUBLICATIONS

Scania CV AB, International Application No. PCT/SE2017/050468, International Preliminary Report on Patentability, dated Dec. 11, 2018.
(Continued)

*Primary Examiner* — Patrick Hamo
*Assistant Examiner* — Wesley G Harris
(74) *Attorney, Agent, or Firm* — Moore & Van Allen, PLLC; W. Kevin Ransom

(57) ABSTRACT

A control valve for use in a cam timing phaser arrangement is disclosed comprising a cylindrical valve body, a rotational shuttle element coaxially located within a recess of the valve body, and a blocking pin. When using in a cam timing phaser arrangement having a first phasing chamber and a second phasing chamber, the control valve when non-actuated acts as a double check valve, preventing flow between chambers. Actuation of the blocking pin limits rotation of the rotational shuttle element and results in the control valve allowing flow in a single flow direction between phasing chambers. The allowed direction of flow can be controlled by controlling (Continued)

the timing of the deployment of the blocking pin. A cam timing phaser arrangement, internal combustion engine, and vehicle comprising such a control valve are also disclosed.

15 Claims, 9 Drawing Sheets

(51) Int. Cl.
*F15B 15/12* (2006.01)
*F16K 3/20* (2006.01)
(52) U.S. Cl.
CPC .............. *F15B 15/12* (2013.01); *F16K 3/205* (2013.01); *F01L 2001/3443* (2013.01); *F01L 2001/34423* (2013.01); *F01L 2001/34426* (2013.01); *F01L 2001/34433* (2013.01)
(58) Field of Classification Search
USPC .................... 123/90.12, 90.15, 90.17, 196 R
See application file for complete search history.

(56) References Cited

U.S. PATENT DOCUMENTS

| | | | |
|---|---|---|---|
| 7,000,580 | B1 | 2/2006 | Smith et al. |
| 7,311,069 | B2* | 12/2007 | Kobayashi ............... F01L 1/022 |
| | | | 123/90.15 |
| 8,127,725 | B2 | 3/2012 | Crowe et al. |
| 8,584,636 | B2 | 11/2013 | David et al. |
| 9,080,470 | B2* | 7/2015 | Wigsten ................ F01L 1/3442 |
| 10,107,152 | B2* | 10/2018 | Yasuda ..................... F01L 1/34 |
| 2002/0088413 | A1 | 7/2002 | Smith et al. |
| 2004/0182344 | A1 | 9/2004 | Simpson et al. |
| 2005/0028771 | A1 | 2/2005 | Jiang |
| 2005/0103293 | A1 | 5/2005 | Lancefield |
| 2007/0017463 | A1 | 1/2007 | Mott et al. |
| 2007/0028874 | A1 | 2/2007 | Simpson |
| 2007/0039581 | A1 | 2/2007 | Berndorfer |
| 2008/0135004 | A1 | 6/2008 | Simpson et al. |
| 2009/0071140 | A1 | 3/2009 | Knecht et al. |
| 2009/0178635 | A1 | 7/2009 | Takenaka |
| 2013/0139916 | A1 | 6/2013 | Miyachi |
| 2013/0199478 | A1 | 8/2013 | Tanaka et al. |
| 2013/0206088 | A1 | 8/2013 | Wigsten |
| 2013/0220253 | A1 | 8/2013 | Pluta et al. |
| 2013/0291835 | A1 | 11/2013 | Imamura et al. |
| 2014/0102392 | A1 | 4/2014 | Busse |
| 2014/0251247 | A1 | 9/2014 | Tewes et al. |
| 2014/0261266 | A1 | 9/2014 | Wigsten |
| 2016/0024980 | A1 | 1/2016 | Sakata et al. |
| 2016/0053640 | A1 | 2/2016 | Schafer et al. |
| 2016/0108774 | A1 | 4/2016 | Pietrzyk et al. |
| 2016/0146068 | A1* | 5/2016 | Haltiner, Jr. .......... F01L 1/3442 |
| | | | 123/90.12 |

FOREIGN PATENT DOCUMENTS

| | | |
|---|---|---|
| CN | 102482959 A | 5/2012 |
| CN | 103069115 A | 4/2013 |
| DE | 3930157 A1 | 3/1991 |
| DE | 202004021243 U1 | 4/2007 |
| DE | 102008001801 A1 | 11/2009 |
| DE | 102008002461 A1 | 12/2009 |
| DE | 102011055651 A1 | 5/2013 |
| DE | 102013207616 A1 | 10/2014 |
| DE | 102014218547 A1 | 3/2016 |
| EP | 1522684 A2 | 4/2005 |
| EP | 1598528 A2 | 11/2005 |
| WO | WO2006069156 A1 | 6/2006 |
| WO | WO2006127347 A1 | 11/2006 |
| WO | WO2006127348 A1 | 11/2006 |
| WO | WO2012061233 A2 | 5/2012 |
| WO | WO2014173399 | 5/2012 |

OTHER PUBLICATIONS

International Search Report for International Patent Application No. PCT/SE2017050468 dated Aug. 31, 2017.
Written Opinion of the International Searching Authority for International Patent Application No. PCT/SE2017050468 dated Aug. 31, 2017.

* cited by examiner

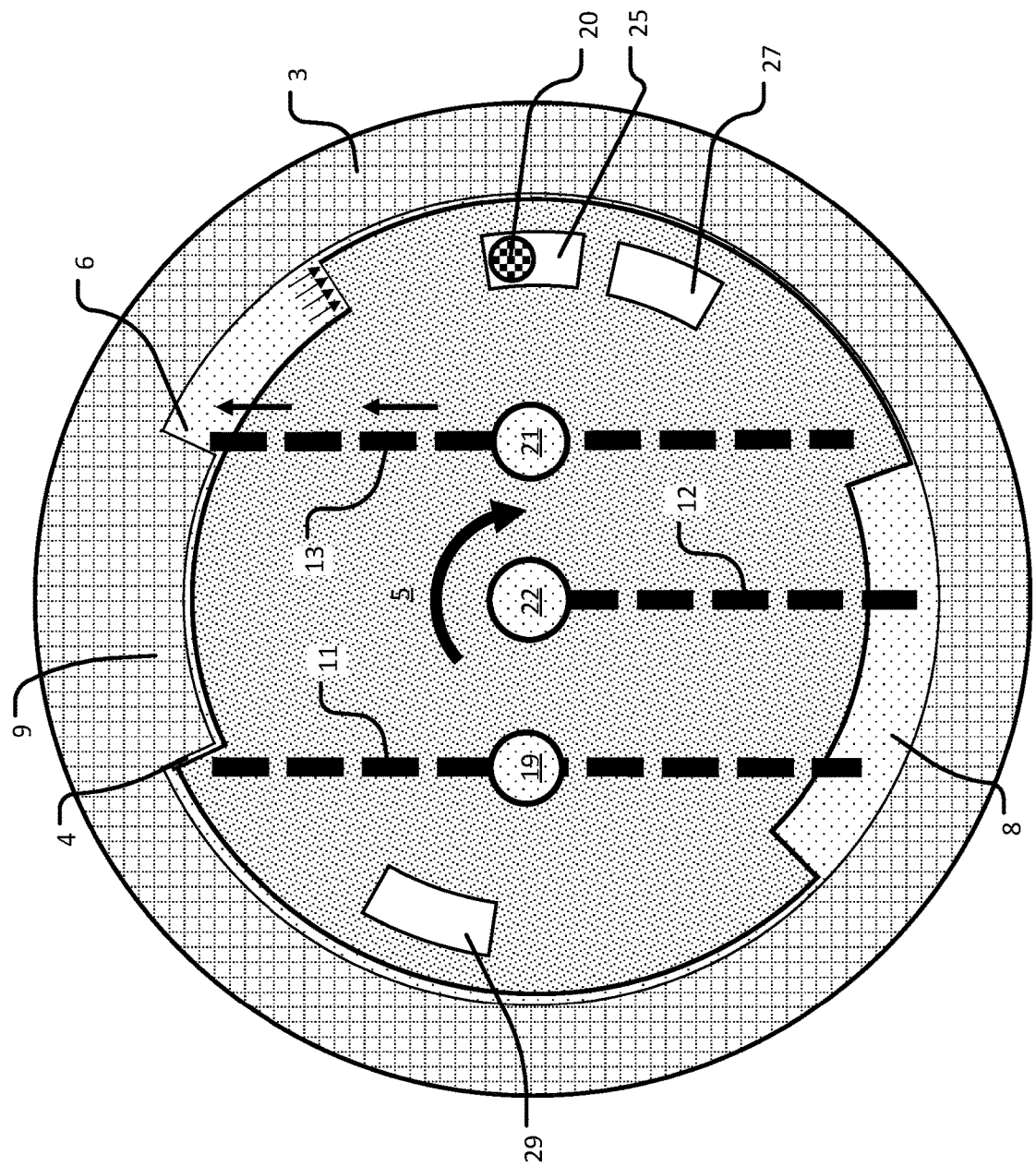

ROTATIONAL HYDRAULIC LOGIC DEVICE AND VARIABLE CAM TIMING PHASER UTILIZING SUCH A DEVICE

CROSS-REFERENCE TO RELATED APPLICATIONS

This application is a national stage application (filed under 35 § U.S.C. 371) of PCT/SE2017/050468, filed May 10, 2017 of the same title, which, in turn, claims priority to Swedish Application No. 1650797-2 filed Jun. 8, 2016; the contents of each of which are hereby incorporated by reference.

FIELD OF THE INVENTION

The present invention concerns a variable cam timing phaser arrangement for an internal combustion engine as well as a method for controlling the timing of a camshaft in an internal combustion engine using such a variable cam timing phaser. The invention also concerns an internal combustion engine and a vehicle comprising such a variable cam timing phaser arrangement.

BACKGROUND OF THE INVENTION

The valves in internal combustion engines are used to regulate the flow of intake and exhaust gases into the engine cylinders. The opening and closing of the intake and exhaust valves in an internal combustion engine is normally driven by one or more camshafts. Since the valves control the flow of air into the engine cylinders and exhaust out of the engine cylinders, it is crucial that they open and close at the appropriate time during each stroke of the cylinder piston. For this reason, each camshaft is driven by the crankshaft, often via a timing belt or timing chain. However, the optimal valve timing varies depends on a number of factors, such as engine load. In a traditional camshaft arrangement the valve timing is fixedly determined by the relation of the camshaft and crankshaft and therefore the timing is not optimized over the entire engine operating range, leading to impaired performance, lower fuel economy and/or greater emissions. Therefore, methods of varying the valve timing depending on engine conditions have been developed.

One such method is hydraulic variable cam phasing (hVCP). hVCP is one of the most effective strategies for improving overall engine performance by allowing continuous and broad settings for engine-valve overlap and timing. It has therefore become a commonly used technique in modern compression-ignition and spark-ignition engines.

Both oil-pressure actuated and cam torque actuated hydraulic variable cam phasers are known in the art.

The oil-pressure actuated hVCP design comprises a rotor and a stator mounted to the camshaft and cam sprocket respectively. Hydraulic oil is fed to the rotor via an oil control valve. When phasing is initiated, the oil control valve is positioned to direct oil flow either to an advance chamber formed between the rotor and stator, or a retard chamber formed between the rotor and stator. The resulting difference in oil pressure between the advance chamber and the retard chamber makes the rotor rotate relative to the stator. This either advances or retards the timing of the camshaft, depending on the chosen position of the oil control valve.

The oil control valve is a three-positional spool valve that can be positioned either centrally, i.e. co-axially with the camshaft, or remotely, i.e. as a non-rotating component of the hVCP arrangement. This oil control valve is regulated by a variable force solenoid (VFS), which is stationary in relation to the rotating cam phaser (when the oil control valve is centrally mounted). The variable force solenoid and the spool valve have three operational positions: one to provide oil to the advance chamber, one to provide oil to the retard chamber, and one to refill oil to both chambers (i.e. a holding position).

The established oil pressure actuated hVCP technology is effective in varying valve timing, but has relatively slow phasing velocities and high oil consumption. Therefore, the latest iterations of hVCP technology utilize a technique known as cam torque actuation (CTA). As the camshaft rotates the torque on the camshaft varies periodically between positive torque and negative torque in a sinusoidal manner. The exact period, magnitude and shape of the cam torque variation depends on a number of factors including the number of valves regulated by the camshaft and the engine rotation frequency. Positive torque resists cam rotation, while negative cam torque aids cam rotation. Cam torque actuated phasers utilize these periodic torque variations to rotate the rotor in the chosen direction, thereby advancing or retarding the camshaft timing. In principle they operate as "hydraulic ratchets", allowing fluid to flow in a single direction from one chamber to the other chamber due to the torque acting on the oil in the chambers and causing periodic pressure fluctuations. The reverse direction of fluid flow is prevented by check valve. Therefore, the rotor will be rotationally shifted relative to the stator every period the torque acts in the relevant direction, but will remain stationary when the torque periodically acts in the opposite direction. In this manner, rotor can be rotated relative to the stator, and the timing of the camshaft can be advanced or retarded.

Cam torque actuation systems therefore require check valves to be placed inside the rotor in order to achieve the "hydraulic ratchet" effect. The directing of oil flow to the advance chamber, retard chamber, or both/neither (in a holding position) is typically achieved using a three-positional spool valve. This spool valve can be positioned either centrally, i.e. co-axially with the camshaft, or remotely, i.e. as a non-rotating component of the cam phasing arrangement. The three-positional spool valve is typically moved to each of the three operative positions using a variable force solenoid.

Patent application US 2008/0135004 describes a phaser including a housing, a rotor, a phaser control valve (spool) and a regulated pressure control system (RCPS). The phaser may a cam torque actuated phaser or an oil pressure activated phaser. The RPCS has a controller which provides a set point, a desired angle and a signal bases on engine parameters to a direct control pressure regulator valve. The direct control pressure regulator valve regulates a supply pressure to a control pressure. The control pressure moves the phaser control spool to one of three positions, advance, retard and null, in proportion to the pressure supplied.

There remains a need for improved cam timing phaser arrangements. In particular, there remains a need for cam timing phaser arrangements that are suitable for use commercial vehicles, which are often subject to heavier engine loads and longer service lives as compared to passenger cars.

SUMMARY OF THE INVENTION

The inventors of the present invention have identified a range of shortcomings in the prior art, especially in relation to the use of existing cam phaser arrangements in commercial vehicles. It has been found that the three-positional spool valves of the oil control valve (OCV) in present systems must be precisely regulated and therefore are sensitive to impurities that may jam the spool in a single position. Due to the need for three-position regulation, the solenoids or pressure regulators used in conjunction with the oil control valve must be able to be precisely regulated to provide varying force, in order to attain three positions. This adds considerable mechanical complexity to the system, making it more expensive, more sensitive to impurities and less robust. It also makes the routines for controlling the cam phaser more complex.

It has been observed that that when the oil control valve is solenoid-actuated and centrally mounted the contact between the solenoid-pin and the oil control valve is non-stationary since the oil control valve rotates and the solenoid-pin is stationary. This sliding-contact wears the contact surfaces and the position accuracy of the oil control valve is compromised over the long-term which affects the cam phaser performance. The accuracy of the variable force solenoid itself must also remain high to ensure precise control over the OCV.

Further, oil leakage of existing cam phaser arrangements is also a problem. Cross-port leakage inside the oil control valve cause oil to escape the hydraulic circuit and increase camshaft oscillations due to decreased system stiffness. This leakage also affects the oil consumption of the cam phaser arrangement. It has been observed that the three-positional spool valves used in regulating oil flow offer many different leakage paths for oil to escape the cam phaser chambers. Most noticeable is the sliding contact surface closest to the variable force solenoid where the valve is solenoid-actuated, as well as the port connected to vent. This leakage increases with increased pressure inside the cam phaser chambers since all the pressure spikes in the system must be absorbed by the oil control valve. These pressure spikes are in turn dependent on camshaft torque and may exceed 50 bars for commercial vehicles. Camshaft torques are higher in heavy-duty vehicles, causing higher pressure spikes and even more leakage.

It has been observed that existing cam phasing systems utilising remotely-mounted oil control valves suffer from even greater system leakage because the pressure spikes from the cam phaser must be transmitted through the camshaft journal bearing before reaching the oil control valve, therefore increasing bearing leakage.

Further, it has been found that the rotor of existing cam torque actuated phasing systems is very compact and complex. Specially-designed check valves must be mounted in the rotor in order to fit in conjunction with the oil control valve. Such check valves are less durable than conventional check valves and add additional expense. Moreover, the rotor requires a complex internal hydraulic pipe system. Due to these requirements, the manufacturing of cam torque actuated cam phasers requires special tools and assembling.

Thus, it is an object of the present invention to provide a control valve for use in a cam torque actuated cam timing phaser arrangement that is mechanically simpler, more robust and less prone to oil leakage than known cam phaser control valves.

It is a further object to provide a cam timing phaser arrangement utilizing cam torque actuation that is mechanically simpler, more robust and less prone to oil leakage than known cam torque actuated cam timing phaser arrangements.

These objects are achieved by the control valve for use in a cam timing phaser arrangement according to the appended claims.

The control valve comprises:
a cylindrical valve body comprising an outer wall, a first end and a second end, wherein the first end has a recess configured for receiving a rotational shuttle element and allowing rotational movement of the rotational shuttle element with respect to the valve body; and
a rotational shuttle element coaxially located within the recess of the valve body;
wherein the recess and rotational shuttle element together define a signalling chamber and a flow chamber;
wherein the recess comprises a vane dividing the signalling chamber into a first signalling chamber on a first side of the vane and a second signalling chamber on a second side of the vane;
wherein the rotational shuttle element is arranged to rotate between at least three positions in response to fluid pressure variations in the first and second signalling chambers; a first position fully rotated in a first rotational direction so that the size of the first signalling chamber relative to the second signalling chamber is maximized, a second position fully rotated in a second rotational direction so that the size of the second signalling chamber relative to the first signalling chamber is maximized, and an intermediate position wherein the size of the first and second signalling chambers are approximately equal;
wherein an actuable blocking pin is configured in the control valve and the rotational shuttle element is configured with two corresponding holes for receiving the blocking pin, a first hole arranged to block the rotational shuttle element from moving to the first position upon receiving the blocking pin and a second hole arranged to block the rotational shuttle element from moving to the second position upon receiving the blocking pin;
wherein the recess comprises a first fluid groove arranged in fluid communication with the first signalling chamber at one end, and arranged to be in fluid communication with the flow chamber at the other end whenever the rotational shuttle element is in the second or intermediate positions, and arranged to be prevented from fluid communication with the flow chamber whenever the rotational shuttle element is in the first position;
wherein the recess comprises a second fluid groove arranged in fluid communication with the second signalling chamber at one end, and arranged to be in fluid communication with the flow chamber at the other end whenever the rotational shuttle element is in the first or intermediate positions, and arranged to be prevented from fluid communication with the flow chamber whenever the rotational shuttle element is in the second position;
wherein the valve body has a first trough running parallel to the first end and second end around the circumference of the outer wall at a position between the first end and the second end of the valve body, and a second trough running parallel to the first trough around the circumference of the outer wall at a position between the first trough and the second end of the valve body;
wherein a first channel through the valve body connects the first fluid groove to the first trough; and
wherein a second channel through the valve body connects the second fluid groove to the second trough.

The control valve when utilized in a variable cam timing phaser arrangement cam be used to provide can phasing by timing the deployment of the blocking pin to allow directional fluid flow from one of the phasing chambers to the other, in the desired direction, while preventing flow in the opposite undesired direction.

A control valve for a cam torque actuated cam phaser constructed in this manner has a number of advantages. It is constructionally simple, requiring only a single simple on/off valve or solenoid to control the control valve and therefore the cam phaser. It has few moving parts and no need for return mechanisms if desired. It is therefore constructionally robust. Since only an on/off blocking pin is used to control the cam phaser, no intermediate position accuracy or fine multi-pressure regulation is needed. This reduces the risk of valve members, solenoids or other parts jamming. Furthermore, the control valve may readily be controlled by a remotely placed actuator or a locally placed actuator.

The recess of the valve body may comprise a third fluid groove arranged to be in fluid communication with the flow chamber and an oil refill channel running through the valve body. The third fluid groove maintains this fluid communication regardless of the position of the rotational shuttle element. Thus, the control valve can also be used to ensure in a constructionally compact and simple manner an appropriate oil pressure in the cam phaser arrangement. This ensures that the cam phaser is sufficiently rigid and prevents vibrations in the camshaft.

The first fluid groove, second fluid groove and third fluid groove may run essentially parallel to each other. This facilitates machining of the control valve.

A fail-safe pin may be configured in the control valve and a corresponding hole may be configured in the rotational shuttle element for receiving the fail-safe pin. When the fail-safe pin is deployed the rotational shuttle element is blocked from rotating to the first position. This provides a constructionally simple means of returning the rotor of the cam phaser to base position in the event of oil system failure. Thus, the use of a torsional spring to bias the cam phaser to base position may be avoided and a greater proportion of the camshaft torque can be utilized in cam phasing.

The rotational shuttle element may shuttle between the first position and the intermediate position whenever the blocking pin is engaged in the first hole, and may shuttle between the second position and a second intermediate position whenever the blocking pin is engaged in the second hole. Thus, the two intermediate positions need not be identical, providing a greater degree of freedom when designing the control valve and greater tolerances when manufacturing the control valve.

According to another aspect of the present invention, the objects of the invention are achieved by a variable cam timing phaser arrangement according to the appended claims.

The variable cam timing phaser arrangement comprises:

a rotor having at least one rotor vane, the rotor arranged to be connected to a camshaft;

a stator co-axially surrounding the rotor, having at least one stator recess for receiving the at least one rotor vane and allowing rotational movement of the rotor with respect to the stator, the stator having an outer circumference arranged for accepting drive force;

wherein the at least one rotor vane divides the at least one stator recess into a first phasing chamber and a second phasing chamber, the first phasing chamber and the second phasing chamber being arranged to receive hydraulic fluid under pressure, wherein the introduction of hydraulic fluid into the first phasing chamber causes the rotor to move in a first rotational direction relative to the stator and the introduction of hydraulic fluid into the second phasing chamber causes the rotor to move in a second rotational direction relative to the stator, the second rotational direction being opposite the first rotational direction; and a control assembly for regulating hydraulic fluid flow from the first chamber to the second chamber or vice-versa; characterized in that the control assembly comprises:

a control valve according to any one of claims 1-4, centrally mounted in the rotor and/or camshaft, wherein the first trough of the control valve is arranged in fluid communication with the first phasing chamber and the second trough of the control valve is arranged in fluid communication with the second phasing chamber; and an actuating device for actuating the blocking pin.

The variable cam timing phaser arrangement described can be used to provide cam phasing by timing the deployment of the blocking pin to allow directional fluid flow from one of the phasing chambers to the other, in the desired direction, while preventing flow in the opposite undesired direction.

A variable cam timing phaser arrangement constructed in this manner has a number of advantages. It is constructionally simple, requiring only a single simple on/off valve or solenoid to control to cam phaser. The cam phaser is more robust due to less complex and/or less sensitive hydraulic components compared to other cam torque actuated cam phasers. The use of only constructionally robust on/off actuation and the avoidance of transferral of pressure spikes through the camshaft bearings means that oil escape paths are fewer and oil consumption lower. The risk of valves or solenoids jamming is lowered since any actuating valves or solenoids used need take only two positions, i.e on/off, meaning that a greater actuating force and/or stronger return mechanisms can be used. More robust solenoids can be used since intermediate position accuracy is not needed. Similarly, no fine multi-pressure regulation is needed to actuate the blocking pin. Check-valves can be mounted externally to the cam phaser (i.e. not in the rotor vanes), thus allowing the use of more established and robust check valves. A further advantage is that the rotor component bears a greater similarity to oil-actuated cam phasers which are cheaper to manufacture than known cam torque actuated cam phasers.

The actuating device may be a ⅔ way on/off solenoid valve having an inlet port in fluid communication with a source of increased fluid pressure, an outlet port in fluid communication with the blocking pin, and a vent port, wherein the solenoid valve in a de-energized state prevents fluid communication from the source of increased fluid pressure to the blocking pin and allows fluid communication from the blocking pin to the vent port, and wherein the solenoid valve in an energized state allows fluid communication from the source of increased fluid pressure to the blocking pin, thereby deploying the blocking pin. Such solenoid valves are readily-available, well-established and sufficiently robust to provide reliable service in commercial and heavy vehicle applications. The solenoid valve may be of the poppet-type, which virtually eliminates the risk for valve jam.

The actuating device may comprise a solenoid-driven plunger arranged in a barrel, the barrel being arranged in fluid communication with the blocking pin, wherein in a de-energized state the solenoid-driven plunger is retracted and in an energized state the solenoid-driven plunger is extended, the energized state increasing the pressure of the fluid at the blocking pin, thereby deploying the blocking pin. Thus the actuation pressure of the blocking pin need not be dependent on the system oil pressure of the vehicle. Utilising a cylinder actuator, the actuation pressure can be designed to be higher than the oil system pressure, or lower, if desired. This allows for greater system robustness.

The actuating device may comprise a stationary mounted on/off solenoid. Thus a centrally-mounted stationary solenoid similar to existing cam phaser control valve actuators may be used, with the difference being that no variable force is required and the solenoid can therefore utilize a greater actuating force and be made more robust.

The hydraulic fluid may be hydraulic oil. The use of hydraulic oil in camshaft phaser arrangements is well-established and reliable.

According to yet another aspect of the invention, a method for controlling the timing of a camshaft in an internal combustion engine comprising a variable cam timing phaser arrangement as described above is provided. The method comprising the steps:

i. Providing the variable cam timing phaser arrangement having the blocking pin in a disengaged position, thereby preventing fluid communication between the first phasing chamber and the second phasing chamber;

ii. Deploying the blocking pin at a time to coincide with the rotational shuttle element being in the first position, thereby engaging the blocking pin to block the second position; or deploying the blocking device at a time to coincide with the rotational shuttle element being in the second position thereby engaging the blocking pin to block the first position;

iii. Maintaining the deployment of the blocking pin thereby allowing fluid to periodically flow in a single direction between the first phasing chamber and the second phasing chamber due to camshaft torque, and preventing fluid flow in the opposite direction, thus rotating the rotor relative to the stator in a chosen direction;

iv. Once the desired rotation of the rotor relative to the stator is obtained, disengaging the blocking pin, thereby preventing further fluid communication between the first phasing chamber and the second phasing chamber.

This method provides a simple, reliable way of controlling camshaft phasing, requiring control of only a single on/off actuator and requiring only a single simple timing of the actuation when initiating phasing in a desired direction.

According to a further aspect, an internal combustion engine comprising a variable cam timing phaser arrangement as described above is provided.

According to yet another aspect, a vehicle comprising a variable cam timing phaser arrangement as described above is provided.

Further aspects, objects and advantages are defined in the detailed description below with reference to the appended drawings.

BRIEF DESCRIPTION OF THE DRAWINGS

For the understanding of the present invention and further objects and advantages of it, the detailed description set out below can be read together with the accompanying drawings, in which the same reference notations denote similar items in the various diagrams, and in which:

FIG. 4c illustrates schematically a control valve in a second state with actuated blocking pin.

DETAILED DESCRIPTION OF THE INVENTION

Figure 1A:
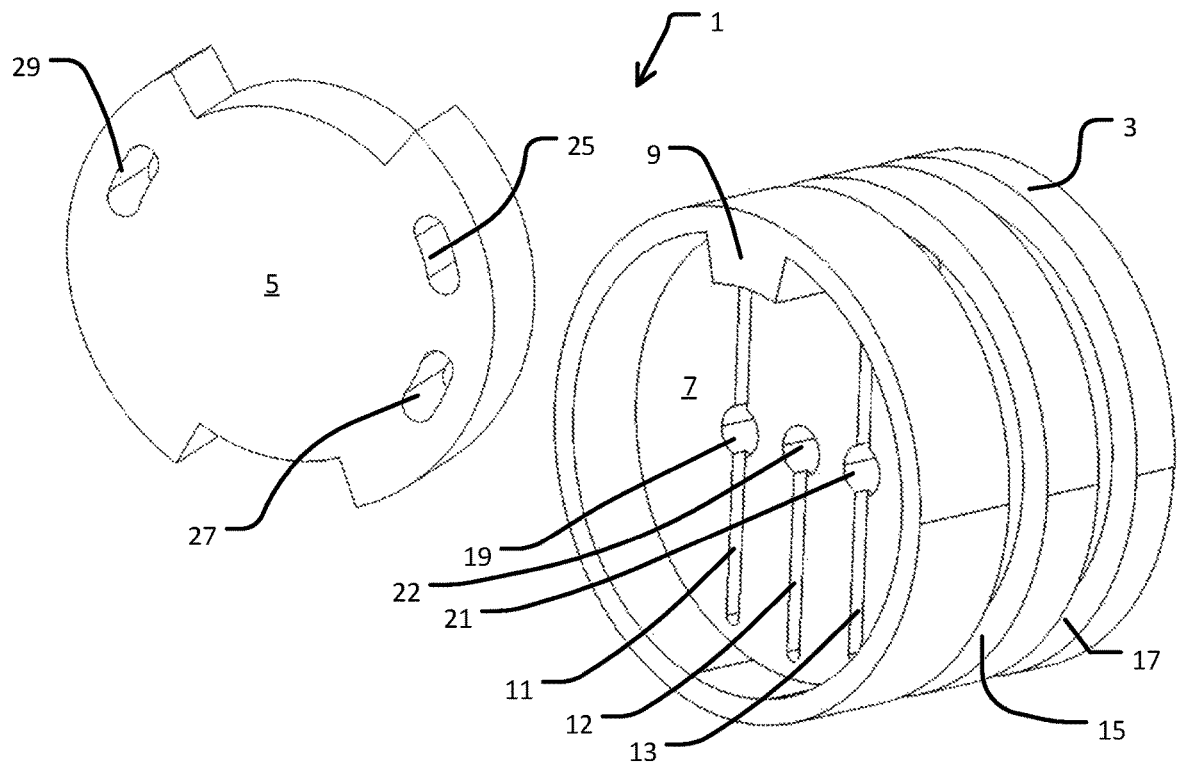
FIG. 1a illustrates schematically a disassembled control valve according to the present disclosure.

The present invention is based on the realization that a valve comprising a valve member ("rotational shuttle element") that is passively moved in response to a pressure difference over the first and second chambers of a cam phaser can be used to control cam torque actuated cam phasing in both directions.

The torque experienced by a camshaft alternates periodically between a positive torque, which retards camshaft rotation, and a negative torque, which abets camshaft rotation. This periodically alternating torque in turn leads to a periodically alternating pressure difference between the first chamber and the second chamber, so that initially there is overpressure in the first chamber, then in the second chamber, then in the first chamber, then in the second chamber, and so on and so forth. If the two chambers are in fluid communication, fluid will flow from the higher pressure chamber to the lower pressure chamber, i.e. the direction of flow will periodically alternate. Conventional cam torque actuated (CTA) cam phasers utilize this alternating pressure by providing two separate unidirectional flow paths between the first chamber and the second chamber: a first path allowing only flow from the first chamber to the second chamber, and a second path allowing only flow in the opposite direction, i.e. from the second chamber to the first chamber. By opening one of these flow paths while closing the other, the alternating pressure difference results in uni-directional flow from one chamber to the other by a "hydraulic ratchet" effect.

The cam timing phaser arrangement of the present invention comprises a rotor, a stator co-axially surrounding the rotor, and a control assembly.

The cam phaser rotor is arranged to be connected to a camshaft of the internal combustion engine. This can be an intake valve camshaft, exhaust valve camshaft, or any other camshaft in the engine such as a combined intake/exhaust camshaft. The rotor has at least one rotor vane, but may preferably have a plurality of vanes, such as three, four, five or six vanes. Separate oil channels for channelling oil to and from the control valve are provided at each side of at least one of the rotor vanes, but preferably at each side of each of the vanes.

The stator is arranged for accepting drive force. This may for example be by connecting the stator to a cam sprocket, which takes up drive force from the crankshaft via the timing belt. The stator may also be constructionally integrated with the cam sprocket. The stator co-axially surrounds the rotor and has at least one recess for accepting the at least one vane of the rotor. In practice, the stator has the same number of recesses as the number of rotor vanes. The recesses in the stator are somewhat larger than the rotor vanes, meaning that when the rotor is positioned in the stator with the vanes centrally positioned in the recesses, a chamber is formed at each side of each rotor. These chambers can be characterized as first phasing chambers, rotating the rotor in a first direction relative to the stator when filled with hydraulic oil, and second phasing chambers, rotating the rotor in a second direction relative to the stator when filled with hydraulic oil.

The control assembly of the present disclosure comprises a control valve.

Where valves are referred to as "on/off" this refers to a valve having only two states: an open state and a closed state. Such valves may however have more than two ports. For example, a 3/2 way on/off valve has three ports and two states. Such a valve often connects two flow ports when open and connects one of the flow ports to a vent/exhaust port when closed.

Where valves are referred to as "normally closed/open/on/off", this refers to the state of the valve when non-actuated. For example, a normally open solenoid valve is held in the open position when not actuated/energized, commonly using a return such as a spring return. When the normally open solenoid valve is actuated/energized the solenoid acts with a force sufficient to overcome the force of the return holding the valve open, and the valve is therefore closed. Upon de-actuation/de-energization, the return returns the valve to the open state.

Where components are stated to be in "fluid communication" or flow is allowed or prevented "between" components, this flow is to be interpreted as not necessarily directional, i.e. flow may proceed in either direction. Directional flow in a single direction is denoted as flow "from" a component "to" another component.

Where a said chamber is referred to as having overpressure, this means that the fluid pressure in the said chamber is higher than in the corresponding chamber on the opposite side of the separating vane. For instance, if the first phasing chamber is stated to have overpressure, this means that the pressure in the first phasing chamber is higher than in the second phasing chamber.

The control valve for use in a cam timing phaser arrangement is located centrally within the rotor and/or camshaft of the cam phaser arrangement. It comprises a valve body having a recess at one end, which is where the control and distribution of oil is performed. Inside this recess sits a rotational shuttle element. A valve cap covers the end of the valve housing having the recess to prevent fluid leakage. The valve cap may also house valve components such as the blocking pin and failsafe pin. The rotational shuttle element is arranged coaxially with the cylindrical valve body and rotates back and forth around this common axis in the recess. The rotational shuttle element resembles a disc having two annular sectors missing from the circumference. The first sector may be positioned diametrically opposite to the second, although other geometrical arrangements are feasible. Each of these missing sectors forms a chamber together with the valve body and recess; the first missing sector forming a signalling chamber and the second missing sector forming a flow chamber. These chambers are intended for receiving and distributing oil. A vane provided in the recess divides the signalling chamber into a first signalling chamber and a second signalling chamber.

The rotational shuttle element may be rotated between two extreme positions, whereby one signalling chamber is much greater in size than the other. In the first position the size of the first signalling chamber is maximized relative to the second signalling chamber, and in the second position the size of the second signalling chamber is maximized relative to the first signalling chamber. In rotating from one extreme position to the other, the rotational shuttle passes through an intermediate position where the first and second chambers are equal in size.

Two grooves are formed in the recess, one in immediate proximity to each side of the vane. Each groove may be in the form of a secant line (chord) that runs parallel to a diameter line that dissects the vane. The grooves do not need to be parallel however, and may diverge or converge running from the vane towards the opposite side of the recess. The grooves may be made by milling the face of the recess. Each groove, together with the face of the rotational shuttle element in proximity to the face of the recess, forms a channel that is always open at the end in proximity to signalling chamber, but may be open or closed at the opposite end in proximity to the flow chamber, depending on the position of the rotational shuttle element. The first groove is in fluid communication with the flow chamber whenever the rotational shuttle element is in the intermediate position or second position, but is prevented from fluid communication whenever the rotational shuttle is in the first position. Likewise, the second groove is in fluid communication with the flow chamber whenever the rotational shuttle element is in the intermediate position or first position, but is prevented from fluid communication whenever the rotational shuttle is in the second position. Thus, the grooves are fluidly connected via the flow chamber when the rotational shuttle is in the intermediate position, but fluid communication between the two grooves is prevented whenever the rotational shuttle is in one of the extreme positions.

First and second circumferential troughs are arranged in the outer wall of the valve housing. These may be made by milling or when casting the valve body. When the control valve is in position in the centre of the cam phaser arrangement, the first trough receives and delivers oil to each of the potentially multiple first chambers of the cam phaser, and the second trough receives and delivers oil to each of the potentially multiple second chambers of the cam phaser.

First and second channels are made through the valve body to connect the first and second troughs to the first and second fluid grooves respectively. These channels may for instance be drilled in the valve body. Each channel may for example be a single straight channel, or two perpendicular channels intercepting at a perpendicular bend.

Thus, the first signalling chamber is always in fluid communication with the first phasing chamber via the first groove, first channel and first trough. Likewise, the second signalling chamber is always in fluid communication with the second phasing chamber via the second groove, second channel and second trough. Whenever the rotational shuttle element is in the first and second positions, the control valve is closed, i.e. flow is prevented between the first and second phasing chambers. Whenever the rotational shuttle element is in the intermediate position, flow is allowed between the first and second phasing chambers via the flow chamber of the control valve.

The control valve operates on the principle that the rotational shuttle element when rotating unhindered in the valve body is pressed back and forth between the two extreme positions by the periodically alternating pressure difference between the first and second phasing chambers. Overpressure in the first phasing chamber moves the rotational shuttle to the first position and overpressure in the second phasing chamber moves the rotational shuttle to the second position. At the same time, the rotational shuttle element acts as a check valve member when in each extreme position, preventing flow in the direction that the pressure difference is acting in. Thus, when unhindered, the rotational shuttle element senses the pressure fluctuations and is moved back and forward between two positions by them, but does not allow fluid communication between the two phasing chambers since it acts as a check valve in both flow directions.

In order to allow cam phasing, the unhindered motion of the rotational shuttle element is blocked to prevent the rotational shuttle element from attaining one of the closed extreme positions; i.e. in one direction of rotation the rotational shuttle element is limited to the intermediate position, whereas in the other direction it can still attain the closed position. The rotational shuttle element is still responsive to the pressure difference between the first and second phasing chambers, but is now moved between an extreme position and an intermediate position. When the rotational shuttle element is in the intermediate position, fluid communication is allowed between the first phasing chamber and the second phasing chamber. Therefore, by shuttling between an extreme position and an intermediate position, the control valve acts in a manner equivalent to a single directional check valve, i.e. when the pressure difference acts in one direction, fluid flow is allowed by the rotational shuttle element, whereas in the other direction fluid flow is prevented by the rotational shuttle element. Thus, the control valve having a blocked rotational shuttle element acts as a "hydraulic ratchet" in a single direction.

The blocking of the rotational shuttle element is performed by an actuable blocking pin arranged in control valve, such as in the valve body or valve cap. The actuable blocking pin is deployable into the recess to hinder rotation of the rotational shuttle element. The rotational shuttle element is configured with two holes to receive the deployed blocking pin. The first hole is positioned and dimensioned to block movement to the first position, but allow shuttling movement between the intermediate and second position. The second hole is positioned and dimensioned to block movement to the second position, but allow shuttling movement between the intermediate and first position. By hole, it is meant either a thoroughgoing hole in the rotational shuttle element, or a recess sufficiently deep to engage the actuable blocking pin. The intermediate position allowed by the first hole does not need to correspond exactly to the intermediate position allowed by the second hole, as long as both intermediate positions allow fluid communication between the two phasing chambers of the cam phaser. Thus the rotational shuttle element may shuttle between the first position and the intermediate position whenever the blocking pin is engaged in the first hole, and the rotational shuttle element may shuttle between the second position and a second intermediate position whenever the blocking pin is engaged in the second hole.

The flow direction permitted by the control valve, and therefore the direction of cam phasing, is determined by the position of the rotational shuttle element when it is initially blocked. If it is in the first position when blocked, the second hole will be engaged by the blocking pin, and the rotational shuttle will alternate between the first (closed) position and the intermediate (open) position; i.e. the second position is blocked. Alternatively, if it is in the second position when blocked, the first hole will be engaged by the blocking pin, and the rotational shuttle will alternate between the second (closed) position and the intermediate (open) position; i.e. the first position is blocked. Thus, the direction of cam phasing can be chosen by timing the blocking of the rotational shuttle element to coincide with the rotational shuttle element being either in the first closed position or the second closed position. Notice that it is the opposing position to the current position of the rotational shuttle element that is blocked. This means that initiation of blocking should be timed to coincide with a pressure difference acting in the opposite direction to the direction of cam phasing desired. The pressures generated by camshaft torque are large and the hydraulic shuttle is easily moveable, and therefore shuttling between positions is momentary. Since the camshaft torque varies periodically with the crank angle and shuttling is rapid, the shuttle position also varies with crank angle and the blocking of the rotational shuttle element is therefore simple to time as desired. Once blocking is initiated, the rotational shuttle element is continually blocked until blocking is ended and therefore timing of the deployment of the blocking pin must be performed only once for each phasing operation.

The actuable blocking pin may be actuated by pneumatic, hydraulic or electric means. Using hydraulic or pneumatic means, the actuator components that control the fluid pressure may be located remotely from the rotating components of the cam phaser arrangement and may instead be placed on a stationary component of the internal combustion engine such as the cam bearing holder. The fluid pressure to the blocking pin may for example be regulated by an on/off solenoid valve that increases fluid pressure by connection to a source of fluid pressure, such as the main oil gallery if oil is used as the actuating fluid. Such a solenoid valve may for example be a 3-port, 2-position on/off solenoid valve being connected to an oil gallery at the inlet port, at the outlet port being connected to an oil channel leading to the blocking pin, and having a vent port for release of oil pressure from the channel leading to the blocking pin when in the "off" position. The solenoid valve may normally be in the "off" position when the solenoid is not actuated, and switch to the "on" position upon activation of the solenoid. The solenoid valve may be any suitable valve type known in the art, including but not limited to a poppet valve, sliding spool valve and rotary spool valve. The use of a poppet valve virtually eliminates the risk for valve jam.

An oil-filled barrel in fluid connection with the blocking pin may be used as the source of fluid pressure. An on/off solenoid-actuated plunger is provided in the barrel. The solenoid-actuated piston may push down on the volume of oil in the cylinder upon actuation, leading to increased pressure at the blocking pin.

Alternatively, the blocking pin may be directly deployed by a stationary solenoid actuator that is centrally mounted in relation to the cam phaser arrangement.

The control valve may be configured to be connected to a source of oil pressure in order to maintain oil supply to the cam phaser system. A control valve connected to a source of oil pressure may be configured to distribute oil between the two chambers by the shuttling movement of the hydraulic shuttle element. For example, the control valve may have an oil refill route comprising a third groove in the recess arranged between the first and second grooves. This third groove is arranged in fluid communication with a source of oil pressure by an oil refill channel through the valve body. The third groove is always in fluid communication with the flow chamber, regardless of the position of the rotational shuttle. A the rotational shuttle moves back and forth, oil is alternatively distributed to the first and second phasing chambers via the first and second signalling channels. The oil refill channel connecting to the source of oil pressure may be provided with a check valve to prevent backflow of oil from the cam phaser assembly to the source of oil pressure.

The cam phaser assembly may also be provided with a number of failsafe features. For example, a pressure-actuated lock pin may be arranged in at least one of the vanes of the rotor, together with a corresponding recess in the stator for receiving the lock pin. The recess for receiving the lock pin is located at a base position, i.e. either fully advanced or fully retarded. The rotor may be biased towards the base position using a torsion spring, the fail-safe pin in the control valve described above, or combinations thereof. The lock pin is normally in the deployed (locking) position, and is actuated to the retracted (unlocked) position when the pressure in a component of the cam phaser arrangement exceeds a threshold pressure. For example, the lock pin may be in fluid connection with one or more channels leading from a phasing chamber to the control valve. The lock pin may alternatively be in fluid connection with an oil refill channel.

A fail-safe pin deploying when the pressure sinks below a threshold value may also be arranged in the control valve in order to control the position of the rotational shuttle element relative to the valve housing in the event of oil failure. The fail-safe pin arrangement comprises a deployable failsafe pin arranged in, for example, the valve cap or valve body, together with a corresponding engagement hole in the rotational shuttle element. This fail-safe pin is deployed when pressure in a chosen part of the cam phaser system falls below a threshold level. This may be for example when pressure in a fluid channel leading to the blocking pin sinks below a threshold level, or when the pressure of the oil supply source sinks below a threshold level. When the fail-safe pin is deployed, the rotational shuttle element is blocked in the same manner as when providing cam phasing using the blocking pin, i.e. by a "hydraulic ratchet" effect. The direction of phasing provided by the failsafe pin is chosen during system design so that the rotor is returned to base position (either fully advanced or fully retarded) upon deployment of the failsafe pin, using camshaft torque actuation. In this manner, the use of a torsion spring biasing the rotor to base position may be avoided and a greater proportion of the camshaft torque produced may be used for rotating the rotor relative to the stator.

During normal operation without cam phasing, the blocking pin is not deployed and no fluid flows between the first phasing chamber and the second phasing chamber due to the control valve acting as a double check valve. When camshaft phasing is desired, the deployment of the blocking pin is timed to coincide with camshaft torque acting in the opposite direction to the desired direction of phasing. For example, if the first chamber has overpressure, the rotational shuttle is in the first position. If blocking is now initiated by deploying the blocking pin, the rotational shuttle element will shuttle between the first position (during periods when the first chamber has overpressure) and the intermediate position (during periods when the second chamber has overpressure). The first position does not permit flow from the first chamber to the second chamber due to the rotational shuttle acting as a check valve member. The rotational shuttle is however prevented from acting as a check valve member in the intermediate position and therefore fluid may flow from the second phasing chamber to the first. In this manner, the rotor is rotated relative to the stator and cam phasing is obtained.

The invention will now be further illustrated with reference to the figures.

Figure 1B:
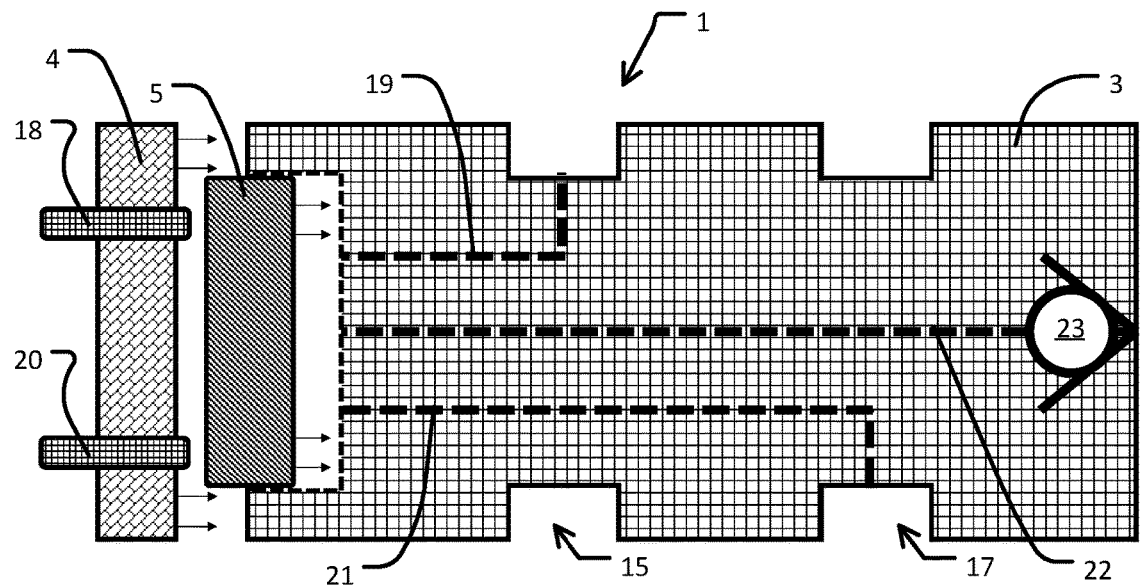
FIG. 1b illustrates schematically a plan view of a partially assembled control valve according to the present disclosure.

FIGS. 1a and 1b show one embodiment of the disclosed control valve. The control valve 1 comprises a valve body 3, a valve cap 4 and a rotational shuttle element 5. In FIG. 1a, the valve body 3 and rotational shuttle element 5 are shown disassembled for clarity. In FIG. 1b, the partially-assembled control valve 1 is shown in plan view.

The valve body 3 comprises a recess 7 shaped to receive the rotational shuttle element 5. The recess 7 comprises a vane 9, a first groove 11, a second groove 13, and a third groove 12. The outside of the valve body has a first trough 15 and a second trough 17 extending around the circumference of the valve body 3. A first channel 19 through the valve body connects the first groove 11 to the first trough 15. A second channel 21 connects the second groove 13 to the second trough 17. An oil refill channel 22 extends through the valve body from the surface of the recess 7 to the opposite end of the valve body. A check valve 23 is arranged in the oil refill channel 22 in proximity to the second end of the valve body. A blocking pin 20 and fail-safe pin 18 are located in the valve cap 4.

The rotational shuttle element 5 resembles a disc with two diametrically opposed annular sectors missing from the circumference. When assembled in the recess these missing sectors form a first signalling chamber, second signalling chamber and flow chamber together with the valve body. The rotational shuttle element 5 has a first hole 25 and second hole 27 for receiving the blocking pin 20, and a third hole 29 for receiving the fail-safe pin 18.

Figure 2:
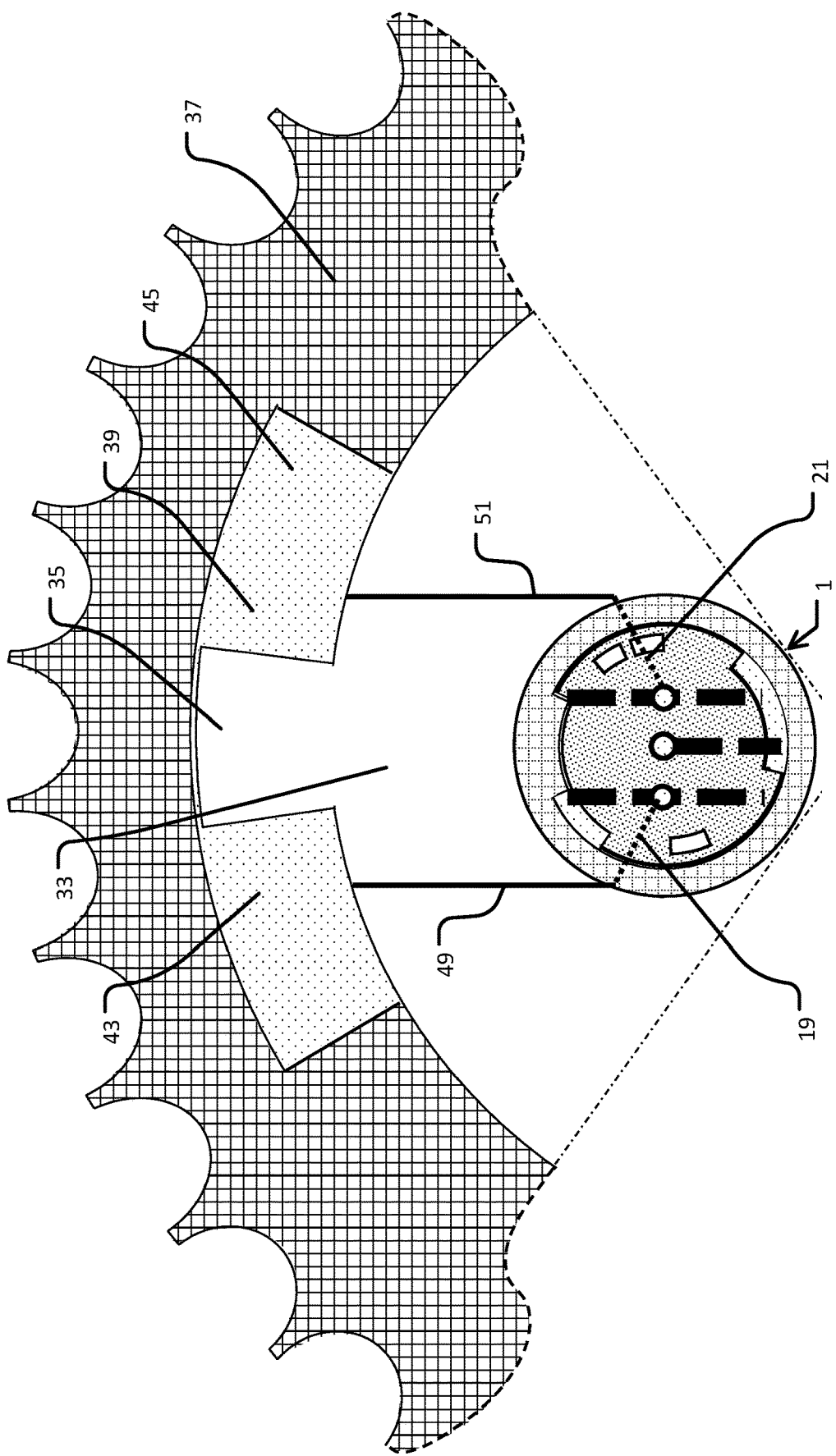
FIG. 2 illustrates schematically a variable cam timing phaser arrangement according to the present disclosure.

FIG. 2 shows a cam phaser arrangement comprising the control valve 1. A rotor 33 comprises at least one rotor vane 35. The rotor is fixed to a camshaft (not shown). A stator 37 having at least one recess 39 co-axially surrounds the rotor 33. The stator is fixed to a cam sprocket (not shown). The rotor vane 35 divides the recess 39 into a first phasing chamber 43 and a second phasing chamber 45. A control valve 1 is arranged centrally in the rotor 33. A first oil channel 49 is arranged at the side of the vane 35 and leads from the first phasing chamber 43 to the first channel 19 of the control valve 1 via the first trough. A second oil channel 51 is arranged at the side of the vane 35 and leads from the second phasing chamber 45 to the second channel 21 of the control valve 1 via the second trough.

Figure 3:
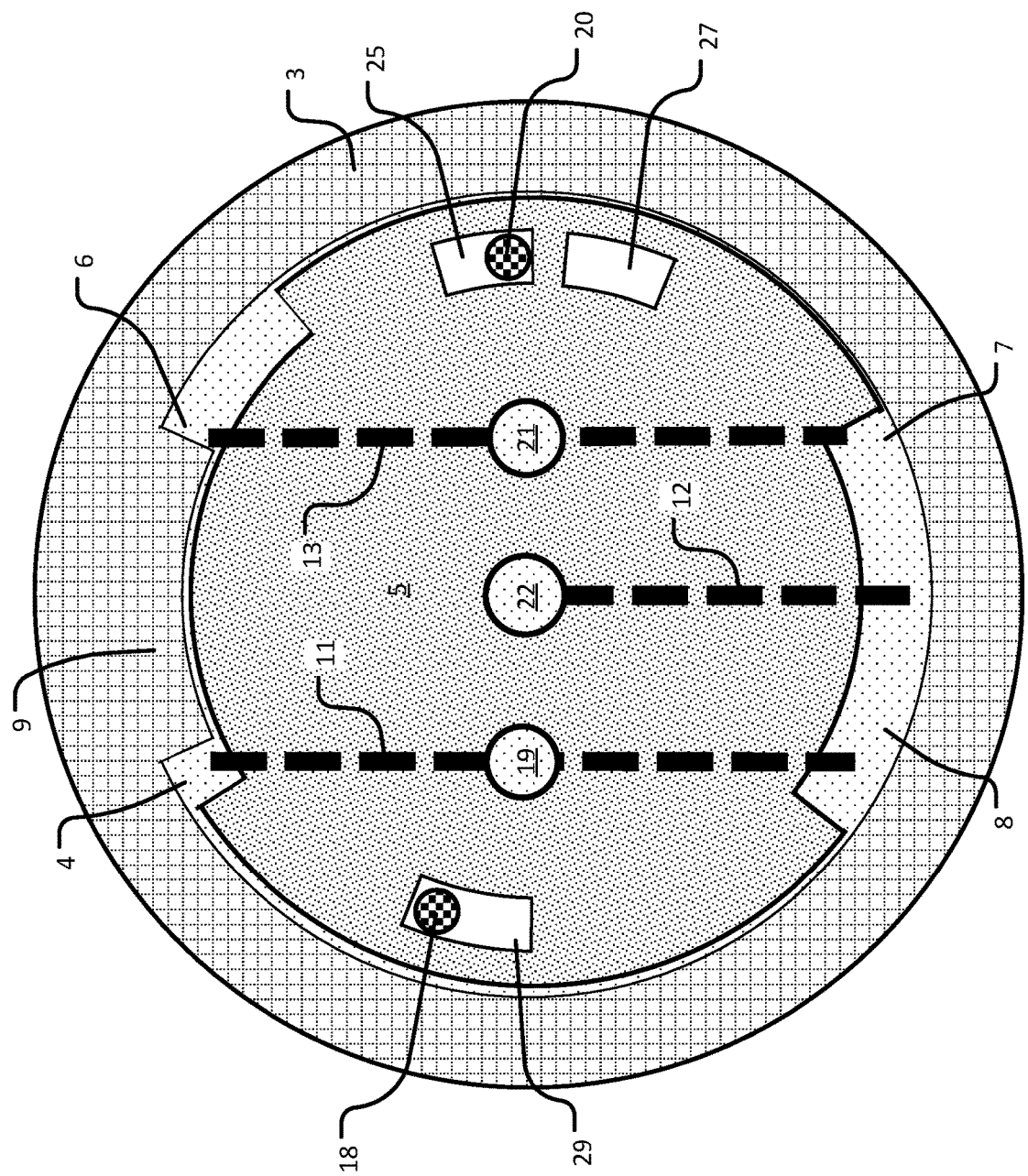
FIG. 3 illustrates schematically an assembled control valve according to the present disclosure.

An assembled control valve is illustrated schematically in FIG. 3. The valve body 3 together with the rotational shuttle element 5 positioned in the recess 7 define a first signalling chamber 4, a second signalling chamber 6 and a flow chamber 8. The first groove 11 is arranged to always allow fluid communication between the first signalling chamber 4 and the first channel 19, which leads to the first phasing chamber (not shown). Likewise, the second groove 13 is arranged to always allow fluid communication between the second signalling chamber 6 and the second channel 21, which leads to the second phasing chamber (not shown). The third groove 12 is connected to a source of oil pressure via the oil refill channel 22 through the valve body. In the intermediate position shown, the first groove 11 and second groove 13 are in fluid communication with the flow chamber 8. However, it can be seen that rotating the rotating shuttle counterclockwise to the first position or clockwise to the second position will prevent fluid communication between the two grooves. An actuable blocking pin 20 is arranged in the valve cap 4, with first 25 and second 27 holes arranged in the rotating shuttle element to receive the blocking pin. A failsafe pin 18 is arranged in the valve cap, as well as a third hole 29 corresponding to the failsafe pin arranged in the rotational shuttle element 5.

The functioning of the control valve and cam phaser arrangement is illustrated in FIGS. 4a-d.

Figure 4A:
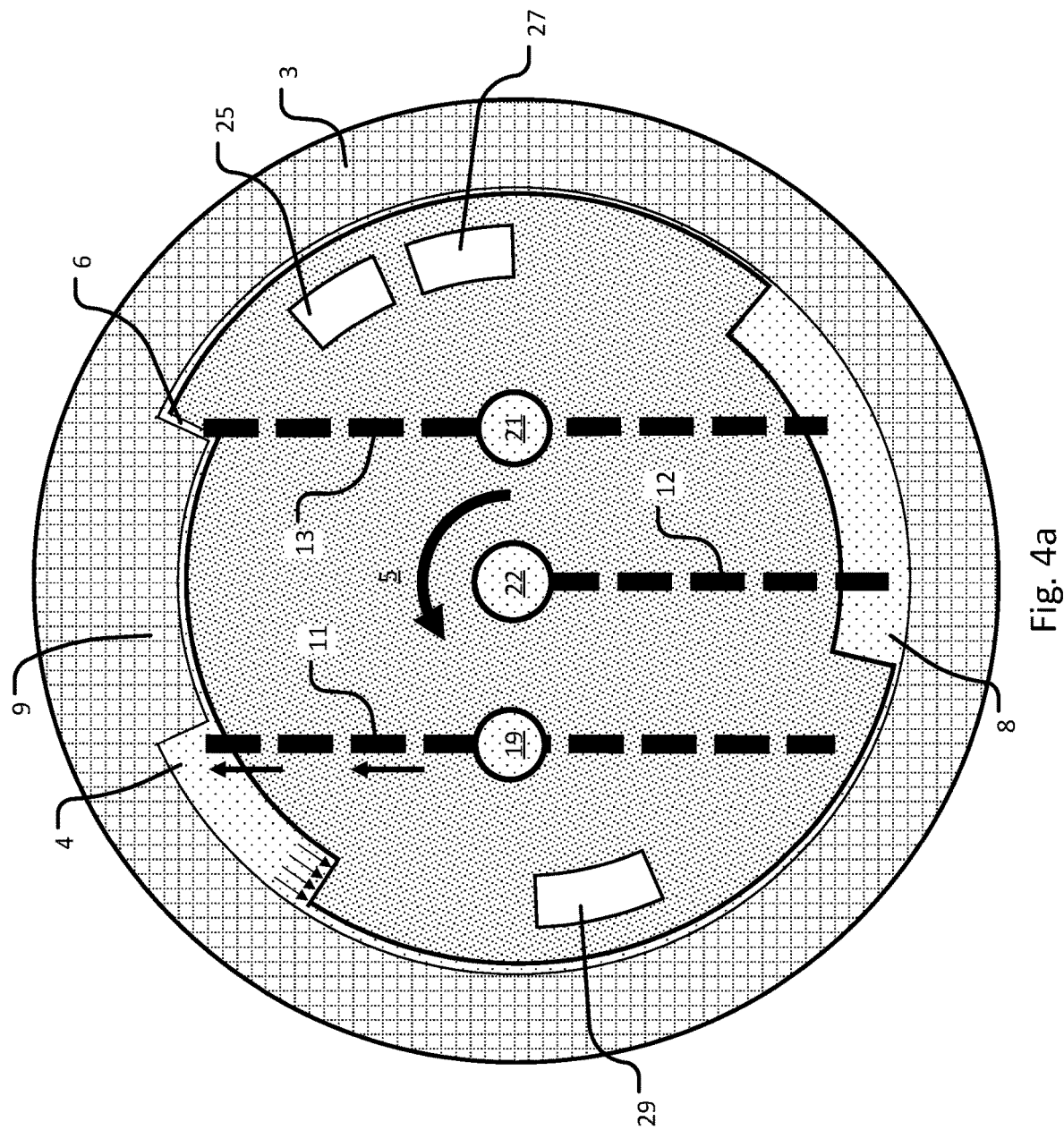
FIG. 4a illustrates schematically a control valve in a first state.

The cam timing phaser arrangement functions as follows. Whenever oil pressure is higher in the first phasing chamber 43 than in the second phasing chamber 45, the rotational shuttle element 5 is moved by fluid pressure to the first position, whereby fluid communication is prevented between the first phasing chamber 43 and the second phasing chamber 45. This first closed state of the cam phaser arrangement is shown in FIG. 4a.

Figure 4B:
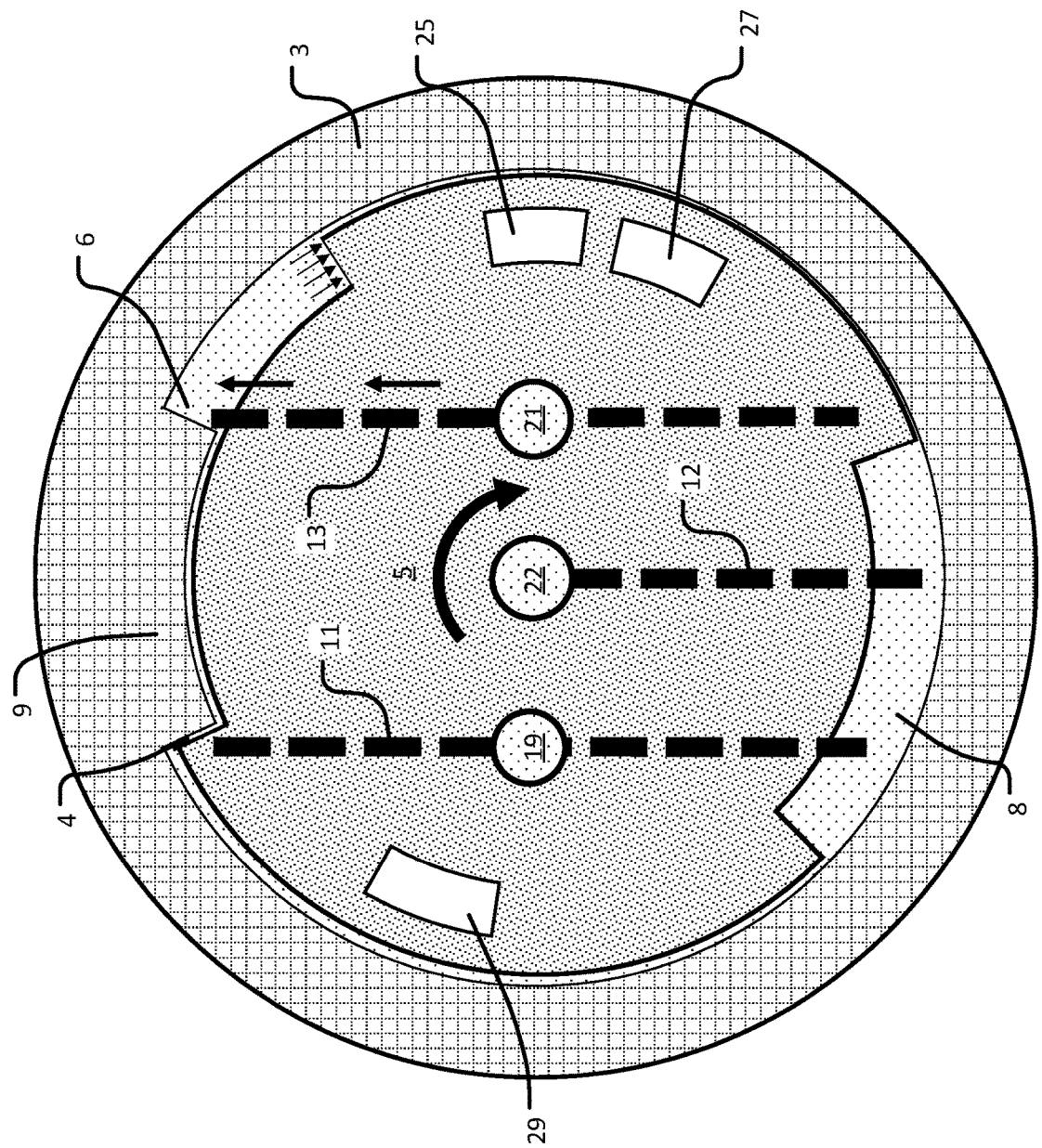
FIG. 4b illustrates schematically a control valve in a second state.

Whenever oil pressure is higher in the second chamber 45 than in the first chamber 43, the rotational shuttle element 5 is moved to the second position, whereby fluid communication is again prevented between the first phasing chamber 43 and the second phasing chamber 45. This second closed state of the cam phaser arrangement is shown in FIG. 4b.

Thus, when unactuated, the control valve prevents flow in both directions, i.e. is in a cam phase holding mode. Note however that the rotational shuttle element 5 takes two separate positions, depending on the direction that the pressure difference that the two chambers 43, 45 works in. This feature is exploited to provide phasing in the desired direction.

If phasing is desired in a first direction, i.e. fluid flow is desired from the first phasing chamber to the second phasing chamber, the blocking pin 20 is deployed during a period when the second chamber has overpressure. Thus, the rotational shuttle element 5 is in the second position, and when the blocking pin 20 is deployed it engages with the first hole 25. This is shown in FIG. 4c.

Figure 4D:
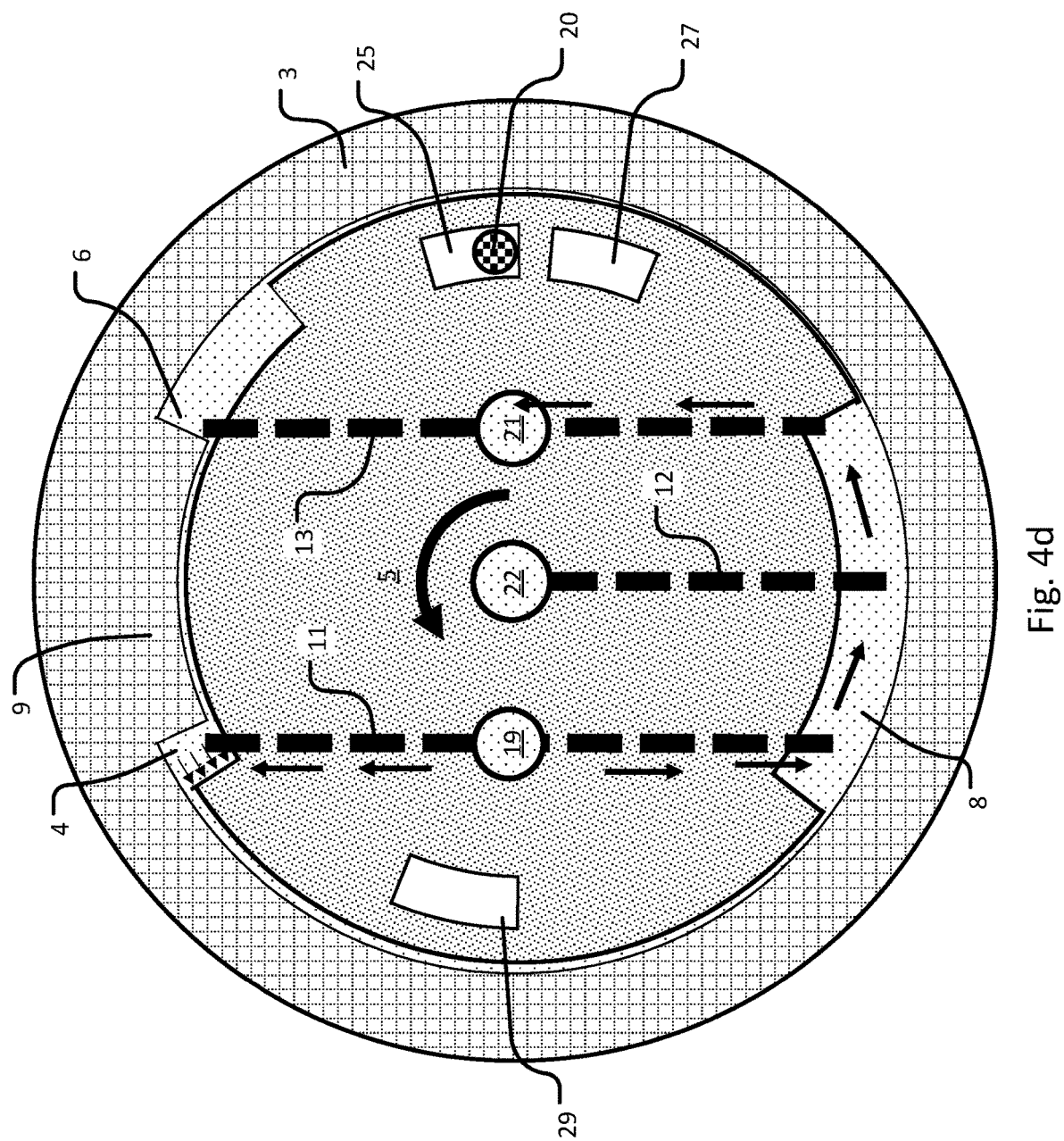
FIG. 4d illustrates schematically a control valve in an intermediate state with actuated blocking pin.

When the direction of camshaft torque now reverses so that pressure acts in the opposite direction and the first chamber 43 has overpressure, the rotational shuttle element 5 is blocked by the engagement of the blocking pin 20 with the first hole 25 from moving to the first position. Instead, the rotational shuttle element is limited to moving to the intermediate position, allowing fluid to flow from the first chamber 43 to the second chamber 45 via the flow chamber 8. This is shown in FIG. 4d.

The hydraulic shuttle element will alternate between being in the second position and the intermediate position until the blocking pin 20 is withdrawn and returned to its non-actuated state. In this manner, oil will periodically flow from the first chamber to the second chamber and a greater degree of phasing will be obtained until the blocking pin 20 is withdrawn.

Phasing is obtained in an analogous manner in the opposite direction by deploying the blocking pin 20 when the rotational shuttle element 5 is in the first position.

Figure 5:
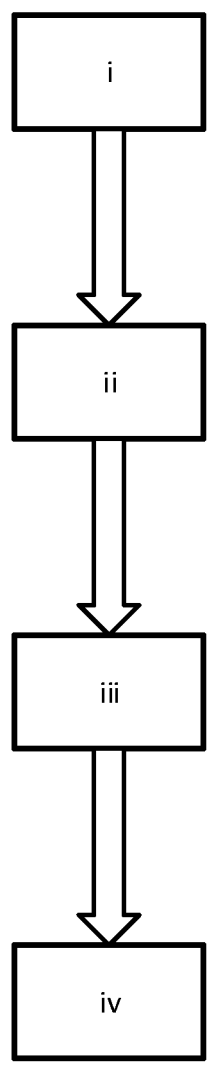
FIG. 5 shows a process flow diagram for a method for controlling the timing of a camshaft in an internal combustion engine according to the present disclosure.

FIG. 5 shows a process flow diagram for a method of controlling the timing of a camshaft in an internal combustion engine comprising a variable cam timing phaser arrangement as disclosed.

In a first step, the cam timing phaser arrangement is provided having the blocking pin in a disengaged position, thereby preventing fluid communication between the first phasing chamber and the second phasing chamber; i.e. the cam phaser arrangement is initially in a cam phasing holding state.

In a second step, the blocking pin is deployed to coincide with the fluid pressure acting in the opposite direction to the direction of phasing desired. This means that the blocking pin will be moved to the engaged position to limit further movement of the rotational shuttle element of the control valve.

In a third step, the deployment of the blocking pin is maintained. During this time, the fluctuating camshaft torque will lead to alternating pressure peaks in the first and second phasing chambers, and the control valve will allow fluid flow in a single direction, thus attaining directional flow from one phasing chamber to the other.

In a fourth step, the blocking pin is disengaged once the desired degree of camshaft phasing is obtained. By disengaging the blocking pin, the cam timing phaser arrangement is returned to the holding state.

Figure 6:
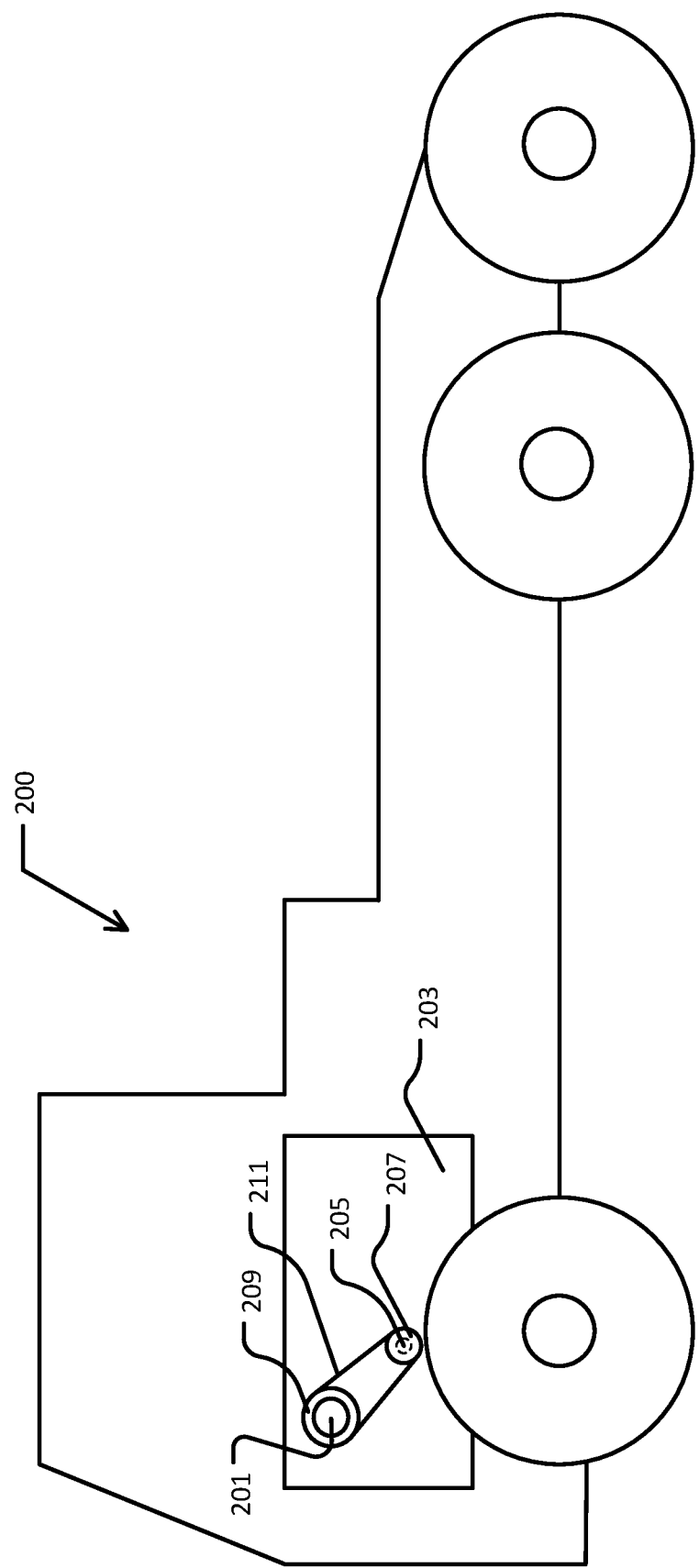
FIG. 6 illustrates schematically a vehicle comprising an internal combustion engine comprising a variable cam timing phaser arrangement according to the present disclosure.

The present invention also relates to an internal combustion engine and a vehicle comprising a variable cam timing phaser arrangement as described above. FIG. 6 shows schematically a heavy goods vehicle 200 having an internal combustion engine 203. The internal combustion engine has a crankshaft 205, crankshaft sprocket 207, camshaft (not shown), camshaft sprocket 209 and timing chain 211. The variable cam timing phaser arrangement 201 is located at the rotational axis of the cam sprocket/camshaft. An engine provided with such a variable cam timing phaser arrangement has a number of advantages such as better fuel economy, lower emissions and better performance as compared to a vehicle lacking cam phasing.

The invention claimed is:

1. A control valve for use in a cam timing phaser arrangement, the control valve comprising:

a cylindrical valve body comprising an outer wall, a first end and a second end, wherein the first end has a recess configured for receiving a rotational shuttle element and allowing rotational movement of the rotational shuttle element with respect to the valve body, wherein the rotational shuttle element coaxially located within the recess of the valve body, wherein the recess and rotational shuttle element together define a signalling chamber and a flow chamber, wherein the recess comprises a vane dividing the signalling chamber into a first signalling chamber on a first side of the vane and a second signalling chamber on a second side of the vane, wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal, wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin, wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position, wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position, wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body, wherein a first channel through the valve body connects the first fluid groove to the first trough, and wherein a second channel through the valve body connects the second fluid groove to the second trough.

2. The control valve according to claim 1, wherein an oil refill channel runs through the valve body and wherein the recess of the valve body comprises a third fluid groove arranged to be in fluid communication with the oil refill channel and the flow chamber, regardless of a position of the rotational shuttle element.

3. The control valve according to claim 2, wherein the first fluid groove, second fluid groove and third fluid groove run essentially parallel to each other.

4. The control valve according to claim 1, wherein a fail-safe pin is configured in the control valve and a corresponding hole is configured in the rotational shuttle element for receiving the fail-safe pin, wherein when the fail-safe pin is deployed the rotational shuttle element is blocked from rotating to the first position.

5. The control valve according to claim 1, wherein the rotational shuttle element shuttles between the first position and the intermediate position whenever the actuable blocking pin is engaged in the first hole, and the rotational shuttle element shuttles between the second position and a second intermediate position whenever the actuable blocking pin is engaged in the second hole.

6. A variable cam timing phaser arrangement for an internal combustion engine comprising:
 a rotor having at least one rotor vane, the rotor arranged to be connected to a camshaft;
 a stator co-axially surrounding the rotor, having at least one stator recess for receiving the at least one rotor vane and allowing rotational movement of the rotor with respect to the stator, the stator having an outer circumference arranged for accepting drive force,
 wherein the at least one rotor vane divides the at least one stator recess into a first phasing chamber and a second phasing chamber, the first phasing chamber and the second phasing chamber being arranged to receive hydraulic fluid under pressure, wherein an introduction of the hydraulic fluid into the first phasing chamber causes the rotor to move in a first rotational direction relative to the stator and an introduction of the hydraulic fluid into the second phasing chamber causes the rotor to move in a second rotational direction relative to the stator, the second rotational direction being opposite the first rotational direction; and
 a control assembly for regulating hydraulic fluid flow from the first phasing chamber to the second phasing chamber or vice-versa, wherein the control assembly comprises:
  a control valve comprising:
   a cylindrical valve body comprising an outer wall, a first end and a second end, wherein the first end has a recess configured for receiving a rotational shuttle element and allowing rotational movement of the rotational shuttle element with respect to the valve body, wherein the rotational shuttle element coaxially located within the recess of the valve body,
 wherein the recess and rotational shuttle element together define a signalling chamber and a flow chamber,
 wherein the recess comprises a vane dividing the signalling chamber into a first signalling chamber on a first side of the vane and a second signalling chamber on a second side of the vane,
 wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal,
 wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin,
 wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position,
 wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position,
 wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body,
 wherein a first channel through the valve body connects the first fluid groove to the first trough,
 wherein a second channel through the valve body connects the second fluid groove to the second trough, and wherein said control valve is centrally mounted in the rotor and/or camshaft, wherein the first trough of the control valve is arranged in fluid communication with the first phasing chamber and the second trough of the control valve is arranged in fluid communication with the second phasing chamber; and an actuating device for actuating the actuable blocking pin.

7. The variable cam timing phaser arrangement according to claim 6, wherein the actuating device is a 3/2 way on/off solenoid valve having an inlet port in fluid communication with a source of increased fluid pressure, an outlet port in fluid communication with the actuable blocking pin, and a vent port, wherein the solenoid valve in a de-energized state prevents fluid communication from the source of increased fluid pressure to the actuable blocking pin and allows fluid communication from the actuable blocking pin to the vent port, and wherein the solenoid valve in an energized state allows fluid communication from the source of increased fluid pressure to the actuable blocking pin, thereby deploying the actuable blocking pin.

8. The variable cam timing phaser arrangement according to claim 6, wherein the actuating device comprises a solenoid-driven plunger arranged in a barrel, the barrel being arranged in fluid communication with the actuable blocking pin, wherein in a de-energized state the solenoid-driven plunger is retracted and in an energized state the solenoid-driven plunger is extended, the energized state increasing a pressure of the hydraulic fluid at the actuable blocking pin, thereby deploying the actuable blocking pin.

9. The variable cam timing phaser arrangement according to claim 6, wherein the actuating device comprises a stationary mounted on/off solenoid.

10. The variable cam timing phaser arrangement according to claim 6, wherein the hydraulic fluid is hydraulic oil.

11. A method for controlling a timing of a camshaft in an internal combustion engine comprising a variable cam timing phaser arrangement, comprising:
a rotor having at least one rotor vane, the rotor arranged to be connected to a camshaft;
a stator co-axially surrounding the rotor, having at least one stator recess for receiving the at least one rotor vane and allowing rotational movement of the rotor with respect to the stator, the stator having an outer circumference arranged for accepting drive force,
wherein the at least one rotor vane divides the at least one stator recess into a first phasing chamber and a second phasing chamber, the first phasing chamber and the second phasing chamber being arranged to receive hydraulic fluid under pressure, wherein an introduction of the hydraulic fluid into the first phasing chamber causes the rotor to move in a first rotational direction relative to the stator and an introduction of the hydraulic fluid into the second phasing chamber causes the rotor to move in a second rotational direction relative to the stator, the second rotational direction being opposite the first rotational direction; and
a control assembly for regulating hydraulic fluid flow from the first phasing chamber to the second phasing chamber or vice-versa, wherein the control assembly comprises:
a control valve comprising:
a cylindrical valve body comprising an outer wall, a first end and a second end, wherein the first end has a recess configured for receiving a rotational shuttle element and allowing rotational movement of the rotational shuttle element with respect to the valve body,
wherein the rotational shuttle element coaxially located within the recess of the valve body,
wherein the recess and rotational shuttle element together define a signalling chamber and a flow chamber,
wherein the recess comprises a vane dividing the signalling chamber into a first signalling chamber on a first side of the vane and a second signalling chamber on a second side of the vane,
wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal,
wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin,
wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position,
wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position,
wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body,
wherein a first channel through the valve body connects the first fluid groove to the first trough,
wherein a second channel through the valve body connects the second fluid groove to the second trough, and wherein said control valve is centrally mounted in the rotor and/or camshaft, wherein the first trough of the control valve is arranged in fluid communication with the first phasing chamber and the second trough of the control valve is arranged in fluid communication with the second phasing chamber; and an actuating device for actuating the actuable blocking pin, the method comprising:

i. providing the variable cam timing phaser arrangement having the actuable blocking pin in a disengaged position, thereby preventing fluid communication between the first phasing chamber and the second phasing chamber;

ii. deploying the actuable blocking pin at a time to coincide with the rotational shuttle element being in the first position, thereby engaging the actuable blocking pin to block the second position of the rotational shuttle element; or deploying the actuable blocking pin at a time to coincide with the rotational shuttle element being in the second position thereby engaging the actuable blocking pin to block the first position;

iii. maintaining the deployment of the actuable blocking pin thereby allowing fluid to periodically flow in a single direction between the first phasing chamber and the second phasing chamber due to camshaft torque, and preventing fluid flow in an opposite direction, thus rotating the rotor relative to the stator in a chosen direction; and iv. once a desired rotation of the rotor relative to the stator is obtained, disengaging the actuable blocking pin, thereby preventing further fluid communication between the first phasing chamber and the second phasing chamber.

12. An internal combustion engine comprising:

a control valve comprising:

a cylindrical valve body comprising an outer wall, a first end and a second end, wherein the first end has a recess configured for receiving a rotational shuttle element and allowing rotational movement of the rotational shuttle element with respect to the valve body, wherein the rotational shuttle element coaxially located within the recess of the valve body, wherein the recess and rotational shuttle element together define a signalling chamber and a flow chamber, wherein the recess comprises a vane dividing the signalling chamber into a first signalling chamber on a first side of the vane and a second signalling chamber on a second side of the vane, wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal, wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin, wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position, wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position, wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body, wherein a first channel through the valve body connects the first fluid groove to the first trough, and wherein a second channel through the valve body connects the second fluid groove to the second trough.

13. A vehicle comprising:

a control valve comprising:

a cylindrical valve body comprising an outer wall, a first end and a second end, wherein the first end has a recess configured for receiving a rotational shuttle element and allowing rotational movement of the rotational shuttle element with respect to the valve body, wherein the rotational shuttle element coaxially located within the recess of the valve body, wherein the recess and rotational shuttle element together define a signalling chamber and a flow chamber, wherein the recess comprises a vane dividing the signalling chamber into a first signalling chamber on a first side of the vane and a second signalling chamber on a second side of the vane, wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal, wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin, wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position, wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position, wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body, wherein a first channel through the valve body connects the first fluid groove to the first trough, and wherein a second channel through the valve body connects the second fluid groove to the second trough.

14. An internal combustion engine comprising a variable cam timing phaser arrangement comprising:
   a rotor having at least one rotor vane, the rotor arranged to be connected to a camshaft;
   a stator co-axially surrounding the rotor, having at least one stator recess for receiving the at least one rotor vane and allowing rotational movement of the rotor with respect to the stator, the stator having an outer circumference arranged for accepting drive force,
      wherein the at least one rotor vane divides the at least one stator recess into a first phasing chamber and a second phasing chamber, the first phasing chamber and the second phasing chamber being arranged to receive hydraulic fluid under pressure, wherein an introduction of the hydraulic fluid into the first phasing chamber causes the rotor to move in a first rotational direction relative to the stator and an introduction of the hydraulic fluid into the second phasing chamber causes the rotor to move in a second rotational direction relative to the stator, the second rotational direction being opposite the first rotational direction; and
   a control assembly for regulating hydraulic fluid flow from the first phasing chamber to the second phasing chamber or vice-versa, wherein the control assembly comprises:
      a control valve comprising:
         a cylindrical valve body comprising an outer wall, a first end and a second end, wherein the first end has a recess configured for receiving a rotational shuttle element and allowing rotational movement of the rotational shuttle element with respect to the valve body,
         wherein the rotational shuttle element coaxially located within the recess of the valve body,
         wherein the recess and rotational shuttle element together define a signalling chamber and a flow chamber,
         wherein the recess comprises a vane dividing the signalling chamber into a first signalling chamber on a first side of the vane and a second signalling chamber on a second side of the vane,
         wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal,
         wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin,
         wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position,
         wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position,
         wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body,
         wherein a first channel through the valve body connects the first fluid groove to the first trough,
         wherein a second channel through the valve body connects the second fluid groove to the second trough, and
         wherein said control valve is centrally mounted in the rotor and/or camshaft, wherein the first trough of the control valve is arranged in fluid communication with the first phasing chamber and the second trough of the control valve is arranged in fluid communication with the second phasing chamber; and an actuating device for actuating the actuable blocking pin.

15. A vehicle comprising a variable cam timing phaser arrangement comprising:

a rotor having at least one rotor vane, the rotor arranged to be connected to a camshaft;

a stator co-axially surrounding the rotor, having at least one stator recess for receiving the at least one rotor vane and allowing rotational movement of the rotor with respect to the stator, the stator having an outer circumference arranged for accepting drive force, wherein the at least one rotor vane divides the at least one stator recess into a first phasing chamber and a second phasing chamber, the first phasing chamber and the second phasing chamber being arranged to receive hydraulic fluid under pressure, wherein an introduction of the hydraulic fluid into the first phasing chamber causes the rotor to move in a first rotational direction relative to the stator and an introduction of the hydraulic fluid into the second phasing chamber causes the rotor to move in a second rotational direction relative to the stator, the second rotational direction being opposite the first rotational direction; and a control assembly for regulating hydraulic fluid flow from the first phasing chamber to the second phasing chamber or vice-versa, wherein the control assembly comprises:

a control valve comprising:

a cylindrical valve body comprising an outer wall, a first end and a second end, wherein the first end has a recess configured for receiving a rotational shuttle element and allowing rotational movement of the rotational shuttle element with respect to the valve body, wherein the rotational shuttle element coaxially located within the recess of the valve body, wherein the recess and rotational shuttle element together define a signalling chamber and a flow chamber, wherein the recess comprises a vane dividing the signalling chamber into a first signalling chamber on a first side of the vane and a second signalling chamber on a second side of the vane, wherein the rotational shuttle element is arranged to rotate between at least three positions in response to fluid pressure variations in the first and second signalling chambers; a first position fully rotated in a first rotational direction so that a size of the first signalling chamber relative to the second signalling chamber is maximized, a second position fully rotated in a second rotational direction so that a size of the second signalling chamber relative to the first signalling chamber is maximized, and an intermediate position wherein a size of the first and second signalling chambers are substantially equal, wherein an actuable blocking pin is configured in the control valve and the rotational shuttle element is configured with two corresponding holes for receiving the actuable blocking pin, a first hole arranged to block the rotational shuttle element from moving to the first position upon receiving the actuable blocking pin and a second hole arranged to block the rotational shuttle element from moving to the second position upon receiving the actuable blocking pin, wherein the recess comprises a first fluid groove arranged in fluid communication with the first signalling chamber at one end, and arranged to be in fluid communication with the flow chamber at an other end whenever the rotational shuttle element is in the second or intermediate positions, and arranged to be prevented from fluid communication with the flow chamber whenever the rotational shuttle element is in the first position, wherein the recess comprises a second fluid groove arranged in fluid communication with the second signalling chamber at one end, and arranged to be in fluid communication with the flow chamber at an other end whenever the rotational shuttle element is in the first or intermediate positions, and arranged to be prevented from fluid communication with the flow chamber whenever the rotational shuttle element is in the second position, wherein the valve body has a first trough running parallel to the first end and second end around a circumference of the outer wall at a position between the first end and the second end of the valve body, and a second trough running parallel to the first trough around the circumference of the outer wall at a position between the first trough and the second end of the valve body, wherein a first channel through the valve body connects the first fluid groove to the first trough, wherein a second channel through the valve body connects the second fluid groove to the second trough, and wherein said control valve is centrally mounted in the rotor and/or camshaft, wherein the first trough of the control valve is arranged in fluid communication with the first phasing chamber and the second trough of the control valve is arranged in fluid communication with the second phasing chamber; and an actuating device for actuating the actuable blocking pin.

* * * * *